Jan. 12, 1943.　　　T. M. PRUDDEN　　　2,308,302
ACOUSTICS
Filed Dec. 15, 1938
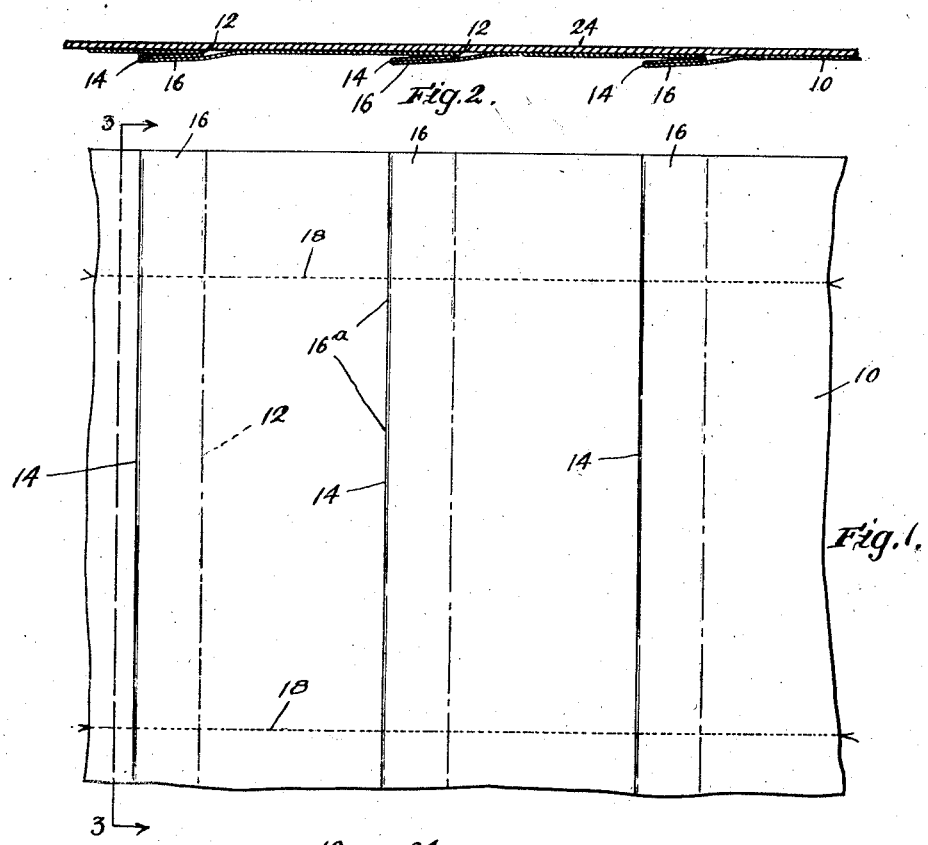
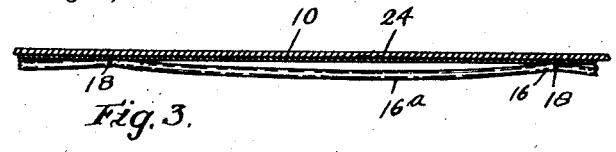
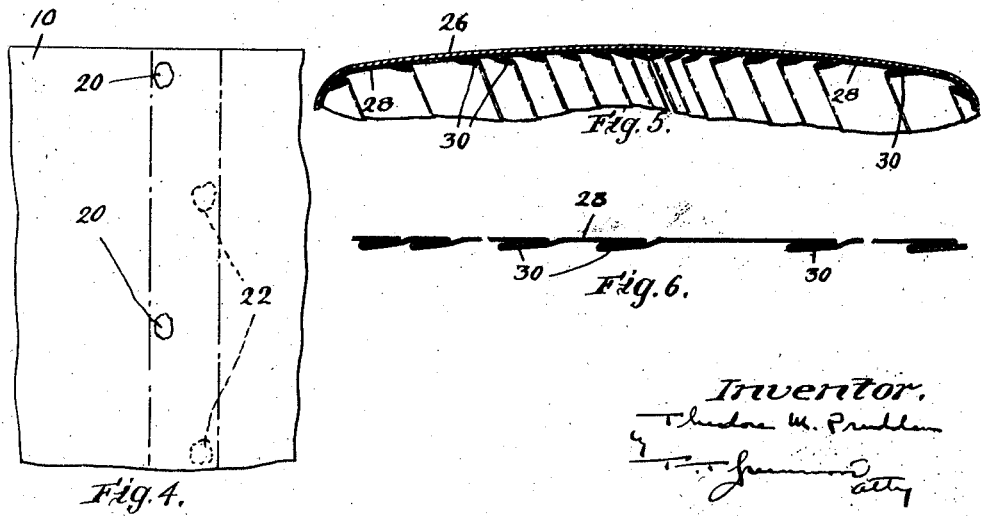
Inventor.
Theodore M. Prudden Patented Jan. 12, 1943

2,308,302

UNITED STATES PATENT OFFICE 2,308,302

ACOUSTICS

Theodore M. Prudden, Hingham Center, Mass.

Application December 15, 1938, Serial No. 245,885

3 Claims. (Cl. 154—44)

This invention relates to the acoustical treatment of a vibratory sound emitting panel that may comprise a part of a room structure as a vehicle body for the purpose of substantially reducing the vibration of such panel to quiet the room.

In an automobile body, for instance, there are usually a number of broad areas of metal sheet or panel that have a tendency to vibrate at audible frequency especially when the automobile is in motion and particularly when the natural or resonant vibration frequency of the panel is approximately the same as some period of sound vibration set up by the car or by external sounds or impacts thereon, thereby rendering the interior of the automobile body noisy.

In my copending application Serial No. 124,426, filed February 6, 1937, on which Letters Patent No. 2,166,848 were granted July 18, 1939, I have disclosed an acoustical treatment for a vibratile panel by which the energy of vibration of the panel is reduced by converting the audible energy into inaudible energy and particularly by causing the vibrating panel to set into motion members which act to set in motion or fan the surrounding air and thus to convert the audible vibration into inaudible air movements and thereby damp the vibratory movement of the panel.

The present invention is in the nature of an improvement on the invention of said application and includes an improved form of the panel damping means disclosed in said application.

A specific object of the present invention is the provision of panel damping means comprising a sheet reflexed at parts thereof to form folds or pleats which damp the vibrations of the panel when the folded or pleated sheet is attached thereto.

The metal top of an automobile vibrates with greatest amplitude in the middle portion thereof and with least amplitude at the side parts thereof. It is an object of the present invention to provide such a panel with a vibration damping means especially vibrating leaves as pleats or folds of a sheet, which leaves or pleats are greater in number where the panel has the greatest amplitude of vibration and are lesser in number where the amplitude of vibration of the panel is less, thereby not only providing for a more uniform damping of the entire panel but also economizing considerably in the weight and cost of the damping means.

A yet further object is generally to improve upon the acoustical treatment of vibrating panels.

Fig. 1 is a plan view of a portion of a panel damping sheet embodying the present invention.

Fig. 2 is an edge view of the sheet of Fig. 1.

Fig. 3 is a section taken along line 3—3 of Fig. 1 and illustrating particularly the looseness of a pleat between the stitch lines.

Fig. 4 is a plan view of a vibration damping sheet prior to folding down the pleats and illustrating a modified form of securing the pleats down upon the body of the sheet.

Fig. 5 is a transverse section of an automobile roof with the vibration damping sheet applied thereto, the sheet having more damping members in the middle portion of the panel than at the sides thereof.

Fig. 6 is an edge view of one of the vibration damping sheets of Fig. 5 illustrating the relative spacing between the vibration damping members.

The panel damping means composing a part of the present invention includes a sheet 10 which preferably is an asphalt impregnated paper known as slater's felt about fifteen thousandths of an inch thick, although it can be any sheet having corresponding characteristics for the purposes of this invention.

The sheet is folded along a series of generally parallel lines 12 and also along a series of generally parallel lines 14 preferably perpendicular to one edge of the sheet to form a plurality of pleats or leaves 16 which are integral with the sheet of which they are formed and are connected flexibly at their one ends and are sufficiently stiff to be vibrated or fluttered and act as air fanning members that are set in motion or vibration at an inaudible frequency by the vibration of the panel and act to damp the vibrations thereof. Good results with automobile tops have been obtained when the length of the pleats or the distance between two adjacent fold lines 12 and 14 is approximately an inch and where the distance between successive pleats or the distance between successive fold lines 12 does not exceed four inches. The length and number of the pleats can, however, be varied to suit conditions.

The pleats preferably are folded down upon the body of the sheet for compactness of the structure and are secured loosely in the aforesaid relation in any suitable manner. In Fig. 1 spaced parallel lines of preferably somewhat loose stitching 18 extended crosswise of the pleats are employed to hold the pleats down. The lines of stitching 18 are spaced apart a satisfactory distance to permit the intermediate unstitched portions 16a of the pleats to stand out sufficiently from the body of the sheet to be free to vibrate by the vibrations of the panel to which the sheet is attached and thereby damp the panel vibrations by setting the surrounding air in motion thereby to dissipate energy of the panel vibrations. A satisfactory spacing between consecutive stitch lines is seven inches for certain constructions. The stitch spacing can be varied, however, to suit requirements. The pleats also can be held down by a series of spaced dots 20 of glue or the like applied to the outside face of a pleat fold near and along the line of the fold line 12 so that the fold will adhere to the body of the sheet. Another line of glue dots 22 is applied to the inner face of a pleat fold near and along the line of the fold line 14 to hold the pleat from opening. The closed pleat thus closely overlies the body of the sheet and yet is free to be vibrated by the vibration of the panel.

The pleated sheet is applied to a face of the vibratile panel 24 in any suitable manner as by a suitable adhesive so that when the panel vibrates it causes the pleats to be agitated or fluttered at their own inaudible rate to move or fan the surrounding air and cause the vibration of the panel to be damped.

Panels that are more or less rigidly supported at their edge portions vibrate with smallest amplitude at such edge portions and with greatest amplitude at their mid portions. A metal automobile top, for instance, is such a panel.

Fig. 5 illustrates in transverse cross-section a metal top panel 26 of more or less arch formation which vibrates least at the edge portions and most in the middle. According to the present invention the vibrations of such panel are damped by the application thereto of a vibration damping sheet, conveniently two edgewise-confronting sheets 28, constructed essentially as has been described in connection with the sheet 10, the sheets having pleats 30 extended longitudinally of the sheets or in the fore and aft direction of the top.

The pleats are spaced closer together in the middle than at the sides so that there are more pleats in the middle where the vibration is of greatest amplitude than at the sides where there is a smaller amplitude of vibration. With this arrangement a maximum damping effect is provided at a minimum weight and expense of damping means. The pleats 30 can be disposed in the manner hereinbefore explained. The vibration damping pleats preferably extend substantially the entire longitudinal dimension of the panel.

I claim:

1. A panel structure comprising the combination of a vibratory panel having different amplitudes of vibration in different parts thereof, and air-fanning vibration damping members associated with said panel, there being more damping members associated with the part of the panel having the greatest amplitude of vibration than are associated with the part of the panel having a lesser amplitude of vibration and connections between said damping members and the panel operative to cause the vibrating panel to agitate said damping members and damp the panel vibrations.

2. A panel structure comprising the combination of a vibratory panel having different amplitudes of vibration in different parts thereof, and a plurality of leaves attached to said panel to transmit panel vibrations to said leaves, said leaves having free ends arranged to be set into motion by the vibration of said panel whereby to damp said vibration, there being more leaves associated with that part of the panel having a large amplitude of vibration than is associated with that part of the panel having a smaller amplitude of vibration.

3. A panel structure comprising the combination of a vibratory panel, and panel-vibration damping means comprising a sheet having vibratile leaves attached to said panel to be vibrated thereby, said leaves being most numerous where the amplitude of panel vibration is greatest.

THEODORE M. PRUDDEN.